(12) United States Patent
Suzuki et al.

(10) Patent No.: US 7,917,287 B2
(45) Date of Patent: Mar. 29, 2011

(54) NAVIGATION DEVICE, NAVIGATION METHOD, AND COMPUTER PRODUCT

(75) Inventors: Yusuke Suzuki, Tokyo (JP); Keisuke Onishi, Tokyo (JP); Shin Kikuchi, Tokyo (JP)

(73) Assignee: Navitime Japan Co., Ltd., Tokyo (JP)

( * ) Notice: Subject to any disclaimer, the term of this patent is extended or adjusted under 35 U.S.C. 154(b) by 950 days.

(21) Appl. No.: 10/546,239

(22) PCT Filed: Oct. 20, 2004

(86) PCT No.: PCT/JP2004/015523
§ 371 (c)(1),
(2), (4) Date: Aug. 22, 2005

(87) PCT Pub. No.: WO2005/040723
PCT Pub. Date: May 6, 2005

(65) Prior Publication Data
US 2006/0178817 A1 Aug. 10, 2006

(30) Foreign Application Priority Data
Oct. 23, 2003 (JP) .................................. 2003-363518

(51) Int. Cl.
*G01C 21/30* (2006.01)
*G01C 21/32* (2006.01)

(52) U.S. Cl. ........ 701/209; 701/200; 701/208; 340/988; 715/845

(58) Field of Classification Search ................ 369/13.01, 369/13.5, 6; 701/200–213; 340/905, 995.1, 340/988–990; 715/845; 707/E17.009, 999.107; 455/26.1, 95, 422.1; 705/400
See application file for complete search history.

(56) References Cited

U.S. PATENT DOCUMENTS 7,324,897 B2 * 1/2008 Schmitz ....................... 701/211
7,359,797 B2 * 4/2008 Dorfman et al. ............. 701/207
(Continued)

FOREIGN PATENT DOCUMENTS
EP  1 106 965 A1  6/2001
(Continued)

OTHER PUBLICATIONS

"iStreetView.TM. 360-Degree Geo-Coded Street Level Imaging on the Web," .Copyrgt. 2003 @City, <http://www.atcity.com> [retrieved May 3, 2004]. cited by other.*

(Continued)

*Primary Examiner* — Cuong H Nguyen
(74) *Attorney, Agent, or Firm* — Oblon, Spivak, McClelland, Maier & Neustadt, L.L.P.

(57) ABSTRACT

A navigation device performs a route guidance based on a route from a current location to a destination. A communication controller sends a request for searching the route to a server. A guidance-information receiving unit receives information on the route from the server. A time measuring unit measures an elapsed time from a start of the route guidance. A guidance controller performs the route guidance based on the information received. The communication controller commands the navigation device to cut off a communication with the server and to stand by upon a determination that the elapsed time measured has reached a predetermined time and when the route is being guided or a current location is being checked by the guidance controller, to decrease a bandwidth usage between the navigation device and the server and to reduce a communication charge associated with the bandwidth usage.

7 Claims, 17 Drawing Sheets

U.S. PATENT DOCUMENTS

| | | | |
|---|---|---|---|
| 7,460,872 B2 * | 12/2008 | Millard et al. | 455/456.5 |
| 7,480,561 B2 * | 1/2009 | Furukawa | 701/202 |
| 7,512,484 B2 * | 3/2009 | Furukawa | 701/200 |
| 7,548,753 B2 * | 6/2009 | Millard et al. | 455/456.5 |
| 7,574,428 B2 * | 8/2009 | Leiserowitz et al. | 707/3 |
| 7,587,276 B2 * | 9/2009 | Gold et al. | 701/211 |
| 7,660,667 B2 * | 2/2010 | Furukawa | 701/212 |
| 2001/0019309 A1 * | 9/2001 | Saeki | |
| 2003/0229441 A1 * | 12/2003 | Pechatnikov et al. | 701/201 |
| 2006/0178817 A1 * | 8/2006 | Suzuki et al. | 701/209 |
| 2008/0086391 A1 * | 4/2008 | Maynard et al. | 705/28 |

FOREIGN PATENT DOCUMENTS

| | | | |
|---|---|---|---|
| EP | 1106965 A * | 6/2001 | |
| EP | 1 139 317 A2 | 10/2001 | |
| EP | 1 338 865 A1 | 8/2003 | |
| EP | 1338865 A * | 8/2003 | |
| GB | 2 385 223 S | 8/2003 | |
| JP | 08-159797 | 6/1996 | |
| JP | 09-152352 | 6/1997 | |
| JP | 10-221426 | 8/1998 | |
| JP | 11-230770 | 8/1999 | |
| JP | 2000-55177 * | 3/2000 | |
| JP | 2000-258184 | 9/2000 | |
| JP | 2000-341738 | 12/2000 | |
| JP | 2001-016158 | 1/2001 | |
| JP | 2001-245337 | 9/2001 | |
| JP | 2002-081957 | 3/2002 | |
| JP | 2002-168645 | 6/2002 | |
| JP | 2002-213990 | 7/2002 | |
| WO | 00/79218 | 12/2000 | |
| WO | PCT/JP2004/015523 | * 10/2004 | |

OTHER PUBLICATIONS

A Mixed-Signal Multichip Neural Recording Interface With Bandwidth Reduction; Gosselin, B.; Ayoub, A.E.; Roy, J.-F.; Sawan, M.; Lepore, F.; Chaudhuri, A.; Guitton, D.; Biomedical Circuits and Systems, IEEE Transactions on; vol. 3 , Issue: 3 Digital Object Identifier: 10.1109/TBCAS.2009.2013718; Publication Year: 2009 , pp. 129-141.*

Estimation technique of low crest factor signal in multiple signal representation; Jae-Kwon Lee; Ju-Hyun Yoon; Jin-Up Kim; Advanced Communication Technology, 2008. ICACT 2008. 10th International Conference on; vol. 1; Digital Object Identifier: 10.1109/ICACT.2008.4493883; Publication Year: 2008 , pp. 832-834.*

Effective Bandwidth Improvement Technique Based on Mismatch Analysis; Aja, B.; Artal, E.; de la Fuente, M.L.; Pascual, J.P.; Microwave Conference, 2006. 36th European; Digital Object Identifier: 10.1109/EUMC.2006.281344; Publication Year: 2006 , pp. 1501-1504.*

Cost-effective low-power graphics processing unit for handheld devices; Byeong-Gyu Nam; Jeabin Lee; Kwanho Kim; Seungjin Lee; Hoi-Jun Yoo; Communications Magazine, IEEE; vol. 46 , Issue: 4; Digital Object Identifier: 10.1109/MCOM.2008.4481355; Publication Year: 2008 , pp. 152-159.*

A 658KGates e-streaming video decoder for digital home applications;Chi-Cheng Ju et al.; Solid-State Circuits Conference, 2009. A-SSCC 2009. IEEE Asian;Digital Object Identifier: 10.1109/ASSCC.2009.5357236; Publication Year: 2009 , pp. 33-36.*

Achieving High-Capacity Narrowband Cellular Systems by Means of Multicell Multiuser Detection; Karimifar, S.; Cavers, J.K.; Vehicular Technology, IEEE Transactions on; vol. 57 , Issue: 2; Digital Object Identifier: 10.1109/TVT.2007.905454 Publication Year: 2008 , pp. 945-953.*

Multi-Context-Aware cache accelerating processing on network processors for future Internet traffic; Akimura, A.; Nishi, H.; Advanced Communication Technology (ICACT), 2010 The 12th International Conference on; vol. 1; Publication Year: 2010 , pp. 377-382.*

* cited by examiner

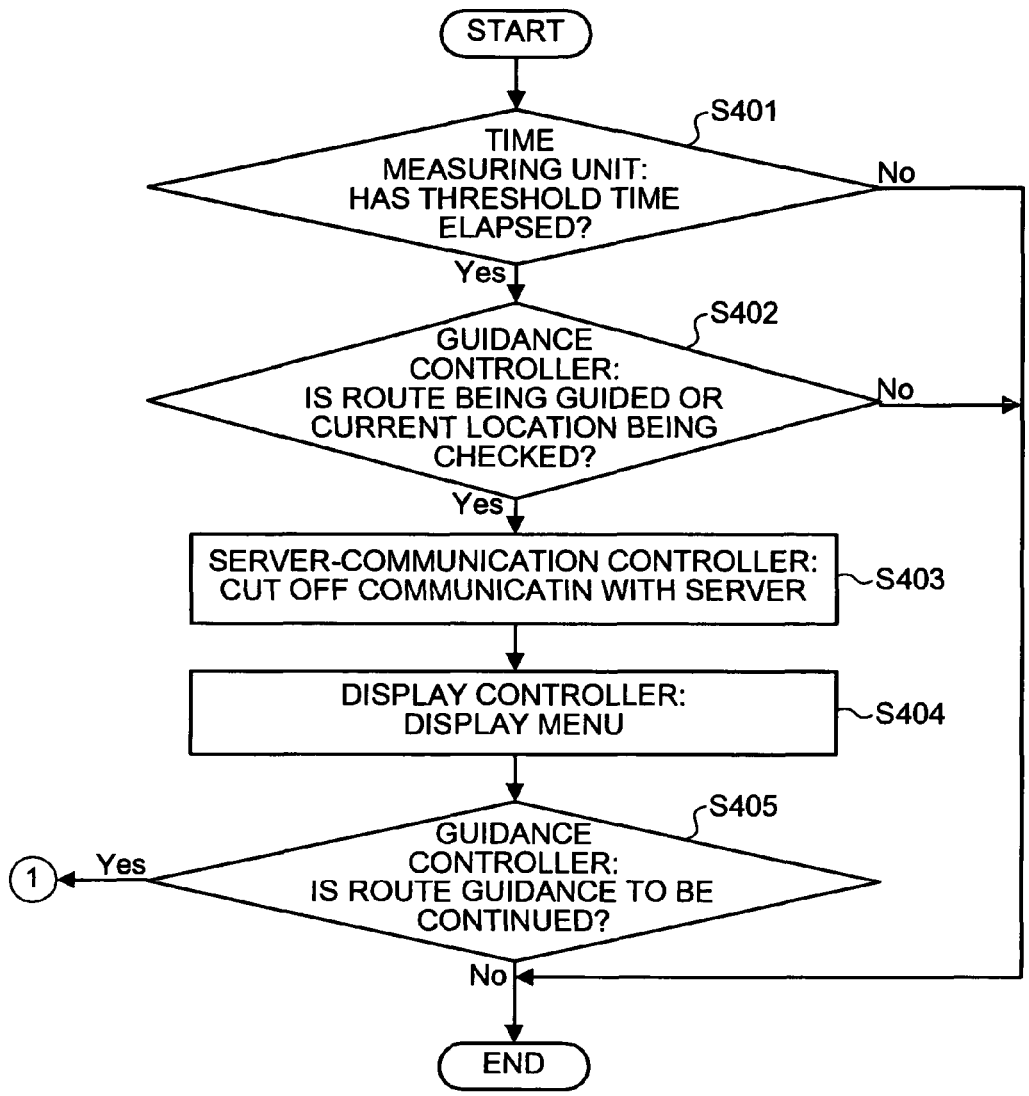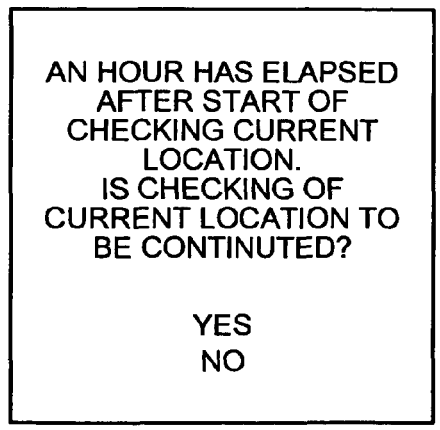

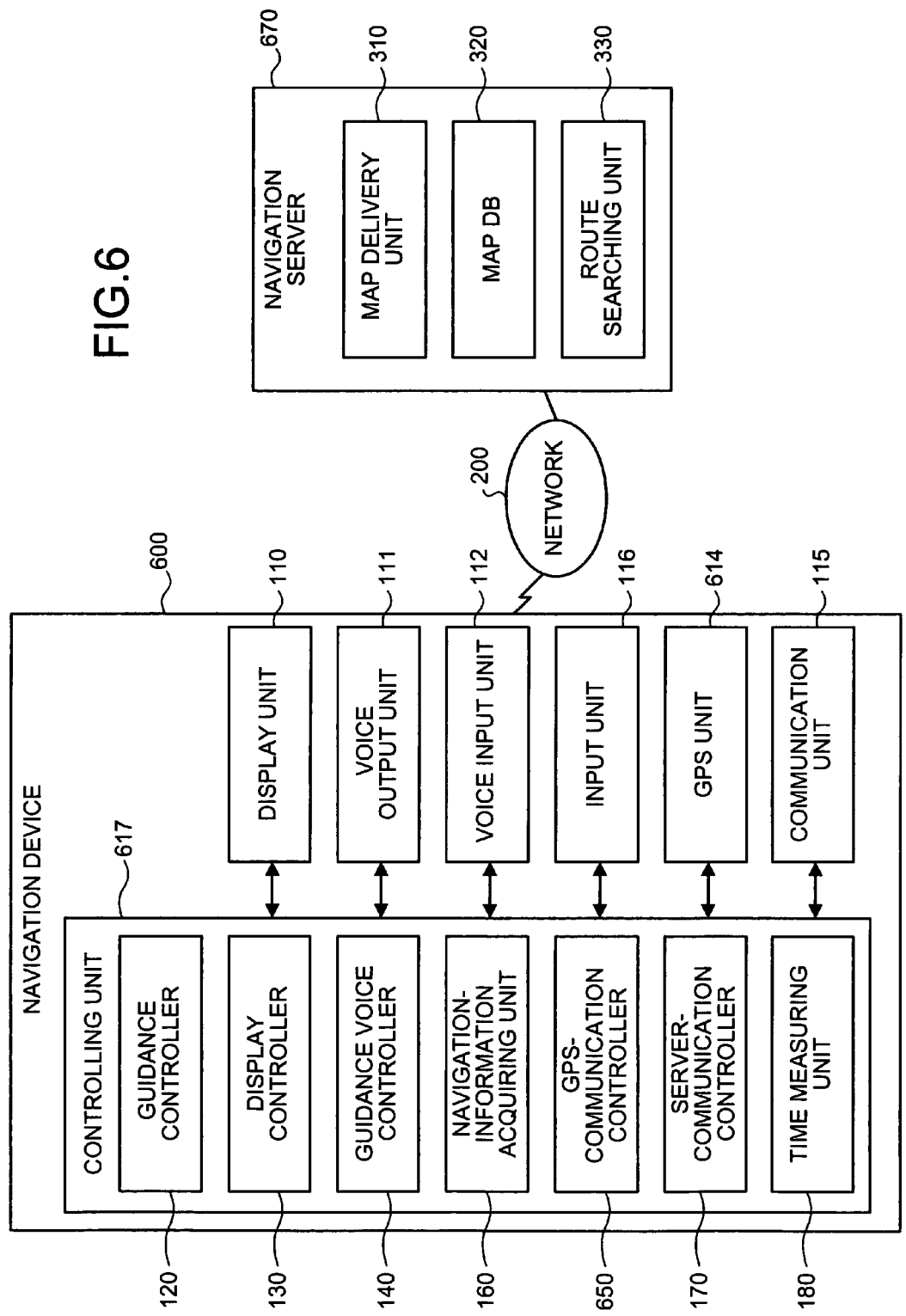

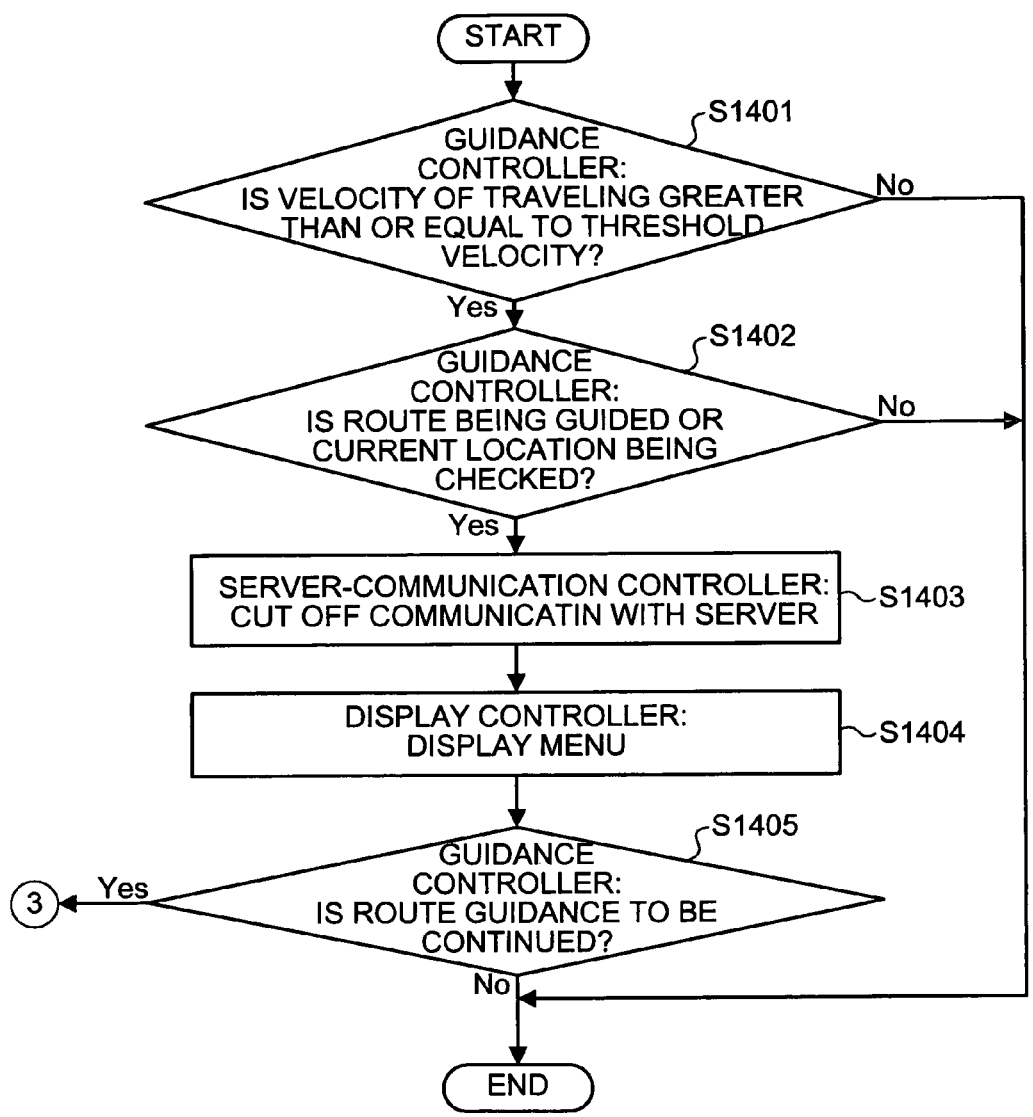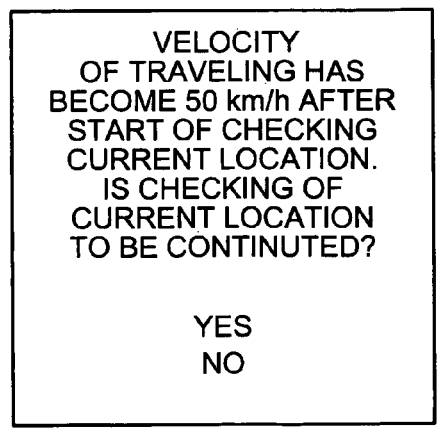

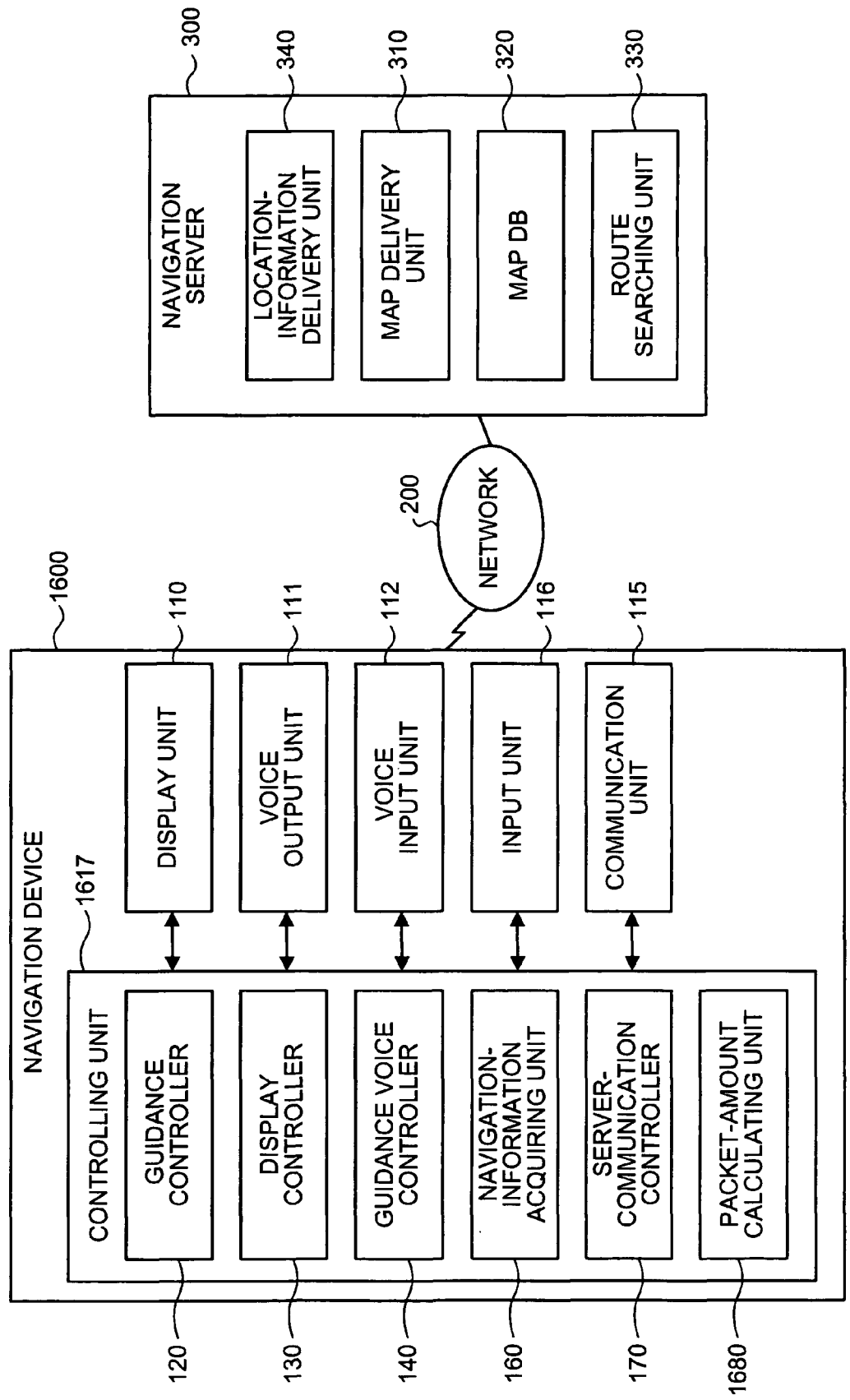

NAVIGATION DEVICE, NAVIGATION METHOD, AND COMPUTER PRODUCT

TECHNICAL FIELD

The present invention relates to a navigation device, a navigation method, and a computer product.

BACKGROUND ART

A conventional navigation device, such as a car navigation system, has a function of searching a route from a place of departure to a destination. Generally, such a navigation device also has a function of rerouting (researching a route afterwards) when a current location that is determined by a Global Positioning System (GPS) is deviated by more than a predetermined distance from a route that was searched and selected at the place of departure. The rerouting is performed automatically, since an operation of the navigation device by a user while driving the vehicle is dangerous.

Some navigation devices perform the automatic rerouting under a predetermined condition. For example, the following patent document 1 discloses a technology that does not perform the rerouting when a vehicle is near any point on the route to the destination, even if the vehicle has deviated from the route.

Moreover, the following patent document 2 discloses a technology that displays, according to a request from a user, a new route that was researched and stored in the navigation device in the background (irrespective of whether the automatic rerouting setting has been done or not) when the vehicle was deviated from a route to the destination.

On the other hand, in recent years, a navigation device not only for a car driver but also for a user who is walking or taking a train or a bus has been proposed (refer to the following patent document 3, for example).

Patent document 1: Japanese Patent Application Laid-open Publication No. H8-159797
Patent document 2: Japanese Patent Application Laid-open Publication No. H9-152352
Patent document 3: Japanese Patent Application Laid-open Publication No. 2000-258184

DISCLOSURE OF THE INVENTION

Problems to be Solved by the Invention

However, a portable navigation device has to acquire information necessary for route guidance, such as map data, from a navigation server in a network.

Thus, an amount of packet transmitted from the navigation server to the portable navigation device increases in proportion to a travel distance and a usage time. The packet amount increases when the current location of the portable navigation device is also sent from the navigation server, which receives the radio signal from the GPS via the portable navigation device and calculates the current location on behalf of the portable navigation device.

However, a user of such a portable navigation device does not necessarily need the map data or the current location all the way to the destination. For example, they are not required necessarily when the user takes a train or a bus, since the route thereof is fixed.

Moreover, for example, the packet amount disadvantageously increases when the user has forgotten the portable navigation device in a vehicle, which keeps receiving the map data etc. from the navigation server irrespective of the fact that the route guidance is not required.

The present invention is made in view of the abovementioned problem. It is an object of the present invention to provide a navigation device, a navigation method, and a computer product that decrease a traffic between the navigation device and the server to reduce communication charges.

Means to Solve the Problems

To solve the problems and achieve the object, a navigation device according to an aspect of the present invention is a navigation device that performs a route guidance based on a route that is selected from among a plurality of routes to a destination including a walking route, and includes: a guidance-information receiving unit that receives information about the route selected from a server that is connected to a network and stores information about the routes; a guidance-control unit that performs the route guidance based on the information received by the guidance-information receiving unit and information about a current location; and a server-communication controlling unit that cuts off a communication with the server based on information about a travel of the navigation device.

A navigation device according to another aspect of the present invention is a navigation device that performs a route guidance based on a route that is selected from among a plurality of routes to a destination including a walking route, and includes: a guidance-information receiving unit that receives information about the route selected from a server that is connected to a network and stores information about the routes; a guidance-control unit that performs the route guidance based on the information received by the guidance-information receiving unit and information about a current location; a data-amount calculating unit that calculates an amount of the information received from the server; and a server-communication controlling unit that cuts off a communication with the server when the amount of the information calculated by the data-amount calculating unit reaches a predetermined value.

A server according to still another aspect of the present invention is a server that is connected, via a network, to a navigation device that performs a route guidance based on a route that is selected from among a plurality of routes to a destination including a walking route, and includes: a storage unit that stores information about the routes; a transmission unit that transmits the information about the routes to the navigation device upon receiving a request from the navigation device; and a data-amount calculating unit that calculates an amount of the information about the routes transmitted by the transmission unit. The transmission unit stops transmitting the information about the routes when the amount of the information about the routes calculated by the data-amount calculating unit reaches a predetermined value.

A navigation method according to still another aspect of the present invention, which is for performing a route guidance based on a route that is selected from among a plurality of routes to a destination including a walking route, includes: receiving information about the route selected from a server that is connected to a network and stores information about the routes; performing the route guidance based on the information received at the receiving and information about a current location; and cutting off a communication with the server based on information about a travel of a navigation device.

A navigation method according to still another aspect of the present invention which is for performing a route guidance based on a route that is selected from among a plurality of routes to a destination including a walking route, includes: receiving information about the route selected from a server that is connected to a network and stores information about the routes; performing the route guidance based on the information received at the receiving and information about a current location; calculating an amount of the information received from the server; and cutting off a communication with the server when the amount of the information calculated at the calculating reaches a predetermined value.

A navigation method according to still another aspect of the present invention, which is for performing a route guidance based on a route that is selected from among a plurality of routes to a destination including a walking route, includes: transmitting the information about the routes to a navigation device upon receiving a request from the navigation device; and calculating an amount of the information about the routes transmitted at the transmitting. The transmitting includes stopping transmitting the information about the routes when the amount of the information about the routes calculated at the calculating reaches a predetermined value.

A computer product according to still another aspect of the present invention, which is for performing a route guidance based on a route that is selected from among a plurality of routes to a destination including a walking route, stores a computer program that causes a computer to execute: receiving information about the route selected from a server that is connected to a network and stores information about the routes; performing the route guidance based on the information received at the receiving and information about a current location; and cutting off a communication with the server based on information about a travel of a navigation device.

A computer product according to still another aspect of the present invention, which is for performing a route guidance based on a route that is selected from among a plurality of routes to a destination including a walking route, stores a computer program that causes a computer to execute: receiving information about the route selected from a server that is connected to a network and stores information about the routes; performing the route guidance based on the information received at the receiving and information about a current location; calculating an amount of the information received from the server; and cutting off a communication with the server when the amount of the information calculated at the calculating reaches a predetermined value.

A computer product according to still another aspect of the present invention, which is for performing a route guidance based on a route that is selected from among a plurality of routes to a destination including a walking route, stores a computer program that causes a computer to execute: transmitting the information about the routes to a navigation device upon receiving a request from the navigation device; and calculating an amount of the information about the routes transmitted at the transmitting. The transmitting includes stopping transmitting the information about the routes when the amount of the information about the routes calculated at the calculating reaches a predetermined value.

Effects due to the Invention

According to the present invention, by receiving information regarding the route that is selected, from the server that is connected to the network and stores information about the route, guiding the route based on the information of current location and information that is acquired, and cutting off the communication with the server based on the information about travel of the device, it is possible to stop reception of information from the server according to a status of travel, to decrease the traffic between the server, and to reduce the load of communication charges.

BRIEF DESCRIPTION OF THE DRAWINGS

FIG. 4 is a flowchart of a communication cut-off process according to the first embodiment.

FIG. 5 is an example of a menu screen according to the first embodiment.

FIG. 6 is a block diagram of a navigation system including a navigation device according to a second embodiment of the present invention.

FIG. 14 is a flowchart of a communication cut-off process according to the fourth embodiment.

FIG. 15 is an example of a menu screen according to the fourth embodiment.

FIG. 16 is a block diagram of a navigation system including a navigation device according to a fifth embodiment of the present invention.

DESCRIPTION OF SIGNS

Figure 1:
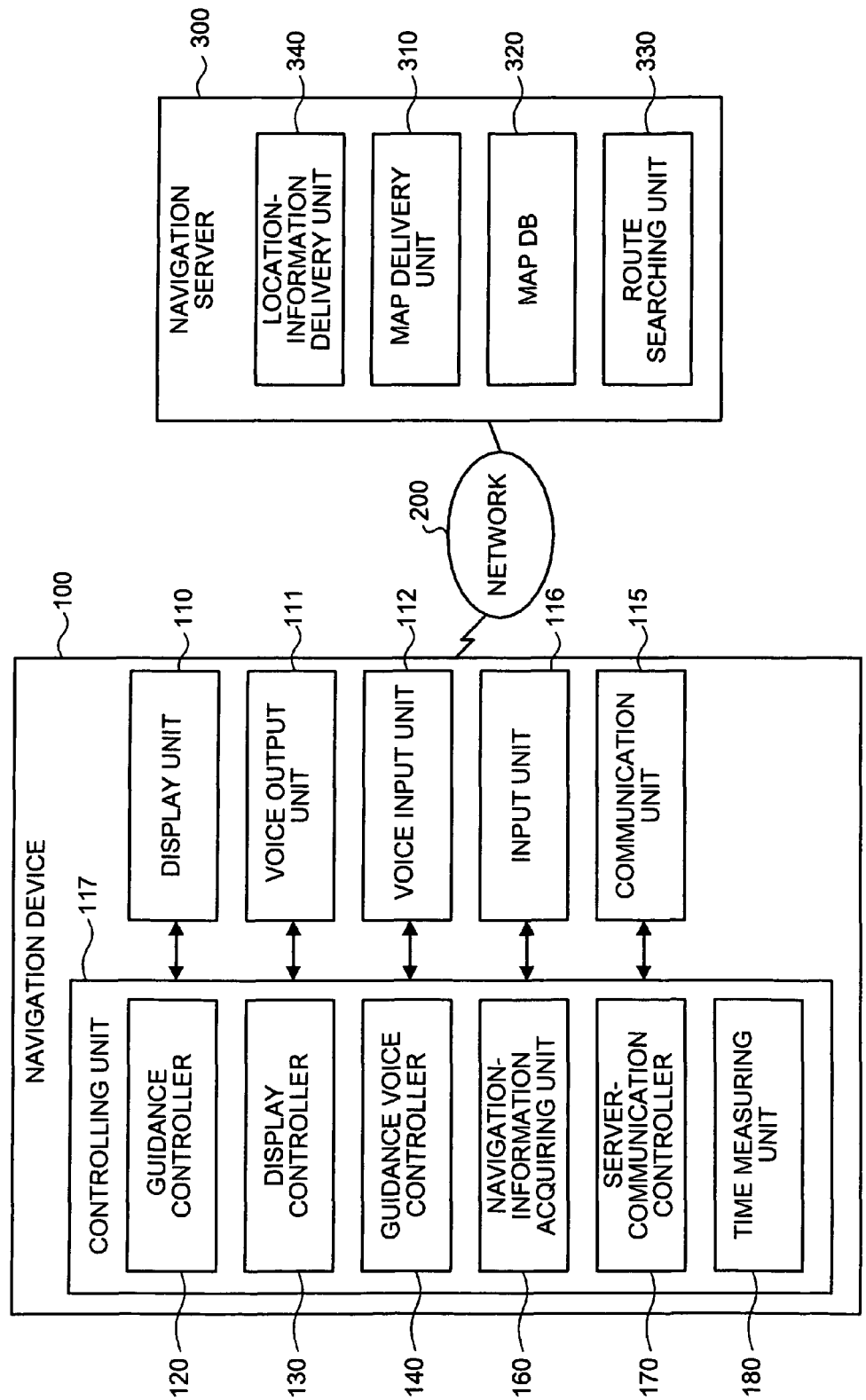
FIG. 1 is a block diagram of a navigation system including a navigation device according to a first embodiment of the present invention.

100, 600, 800, 1200, 1600 navigation device
110 display unit
111 voice output unit
112 voice input unit
115 communication unit
116 input unit
117, 617 controlling unit
120 guidance controller
130 display controller
140 guiding voice controller 160 navigation-information acquiring unit
170 server-communication controller
180 time measuring unit
200 network
300, 670, 2300 navigation server
310 map delivery unit
320 map database
330 route searching unit
340 location-information acquiring unit
614 GPS unit
650 GPS-communication controller
880 distance calculating unit
1280 velocity calculating unit
1680, 2340 packet-amount calculating unit

BEST MODE FOR CARRYING OUT THE INVENTION

Exemplary embodiments of the present invention are described below in detail with reference to the accompanying drawings. The navigation devices according to the embodiments are a portable telephone in which the computer product according to the present invention installed.

First Embodiment

FIG. 1 is a block diagram of a navigation system including a navigation device according to a first embodiment. As shown in FIG. 1, the navigation system includes a navigation device 100, a network 200, and a navigation server 300.

The network 200 is a network such as a portable telephone network and the Internet. The navigation device 100 and the navigation server 300 can exchange various data via the network 200.

The navigation device 100 according to the first embodiment is a portable navigation device that also functions as a portable telephone, and includes a display unit 110, a voice output unit 111, a voice input unit 112, a communication unit 115, an input unit 116, and a controlling unit 117.

The display unit 110 has a Liquid Crystal Display (LCD) and displays various information (such as map data) supplied from the controlling unit 117. The voice output unit 111 has a speaker and outputs voice data supplied from the controlling unit 117. The voice input unit 112 has a microphone, creates voice data corresponding to a voice input by a user, and outputs the voice data to the controlling unit 117. The voice input unit 112 is used for inputting voice of the user when the navigation device 100 functioning as a telephone.

The communication unit 115 has a structure similar to that of a general portable telephone. The communication unit 115 includes an antenna and transfers various data (such as voice data and map data) to and from other communication terminal (such as a portable telephone and a Web server) via the network 200 under a control of the controlling unit 117. The input unit 116 has a numerical pad, creates a signal according to an operation by the user, and outputs the signal to the controlling unit 117. A server-communication controller 170 of the controlling unit 117 controls the communication unit 115 to establish or cut off communication with the navigation server 300 via the network 200.

The controlling unit 117 has a Central Processing Unit (CPU) and a storage unit such as a Read Only Memory (ROM) and a Random Access Memory (RAM). The controlling unit 117 controls the entire navigation device 100 (in other words, each unit of the device) so that the navigation device 100 functions as the portable telephone, by executing a navigation program that is stored in the storage unit.

Moreover, the controlling unit 117 of the navigation device 100 according to the first embodiment controls each unit to execute navigation functions such as a map display and a route guidance. More concretely, the controlling unit 117 includes a guidance controller 120, a display controller 130, a guiding voice controller 140, a navigation-information acquiring unit 160, the server-communication controller 170, and a time measuring unit 180.

The display controller 130 creates display data based on map data delivered from the navigation server 300, and controls the display unit 110 to display the map data. Moreover, the display controller 130 creates display data of various information necessary for navigation, such as characters and patterns. The display unit 110 displays the display data created by the display controller 130, thereby displaying a map indicating a route to be guided, or characters such as "turn to the right".

The guiding voice controller 140 outputs voice data, which corresponds to a voice to be output from the voice output unit 111, to the voice output unit 111 at a predetermined timing during route guidance. For example, when a user of the navigation device 100 comes to a point 30m before an intersection where it is supposed to take a right turn, the guiding voice controller 140 outputs the voice data of a voice such as "right turn at next intersection".

Thus, according to the first embodiment, the display unit 110, the voice output unit 111, the display controller 130, the guiding voice controller 140 perform route guidance for guiding the user along the route, under the control of the guidance controller 120.

The guidance controller 120 controls the above units as mentioned above to perform route guidance. More concretely, the guidance controller 120 controls each unit based on the current location notified by the navigation server 300 and a route selected by the navigation server 300, and causes the units to display guidance information or to provide voice guidance.

The navigation-information acquiring unit 160 makes an access to the navigation server 300 via the communication unit 115 and the network 200, and makes a request for sending information necessary for navigation such as the current location determined by the GPS, map data for displaying a map on the display unit 110, and data indicating a result of route search from a place of departure to a destination.

More concretely, the navigation-information acquiring unit 160, which acquires information on the current location periodically from the navigation server 300, sends a request for map data including the current location to the navigation server 300 if the navigation-information acquiring unit 160 has not yet received the map. The navigation-information acquiring unit 160 also sends to the navigation server 300 a request for route search that includes information necessary for route search, such as the place of departure (it can be the current location or can be set by the user), the destination, a point of passing, and other search conditions such as search priority (shorter time/low cost). Then, the navigation-information acquiring unit 160 acquires the result of the route search and the map data that is sent from the navigation server 300 responding to the request, and supplies it to the display controller 130.

The time measuring unit 180 measures an elapsed time since a timer is set at the start of route guidance. The user sets in advance a threshold time through an initial screen (the threshold time can be changed later). The threshold time can be multiples of a fixed period of time.

The server-communication controller 170 establishes communication with the navigation server 300 when the start of the route guidance is selected in an initial menu (not shown in the diagram). On the other hand, the server-communication controller 170 cuts off the communication with the navigation server 300 when the guidance controller 120 requests, to stop receiving any data from the navigation server 300.

Next, the navigation server 300 is described. The navigation server 300, as shown in FIG. 1, includes a location-information acquiring unit 340, a map delivery unit 310, a map database (DB) 320, and a route searching unit 330.

The location-information acquiring unit 340 receives current location information of the navigation device 100 periodically from a GPS satellite.

The map database 320 is a database that stores the map data.

The map delivery unit 310, when receiving a request from the navigation device 100 (or other navigation device) including the current location thereof, acquires map data including the current location and sends the map data to the navigation device 100 via the network 200.

The route searching unit 330, when receiving a request for route search from the navigation device 100, searches a plurality of routes up to the destination from the place of departure (the destination and the place of departure are included in the request), and sends the result of the route search to the navigation device 100 via the network 200. The route searching unit 330 of the navigation server 300 according to the first embodiment can search not only a car route but also other routes such as a walking route, a bus route, a train route, and a combination thereof. The car route means a route for a vehicle that the user can drive anywhere he/she wants, such as a vehicle for private use and a motorcycle, and does not include a bus route etc. that is determined in advance.

Figure 2:
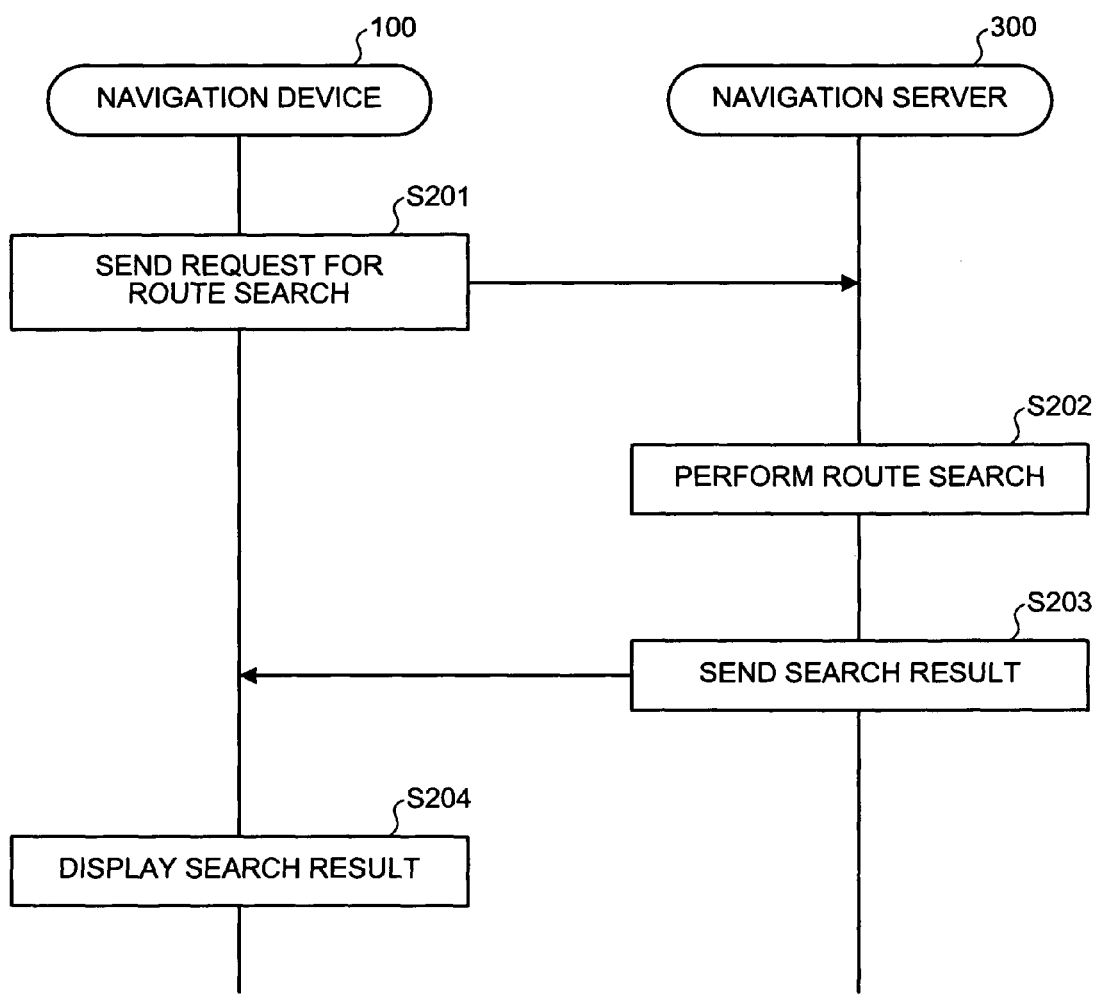
FIG. 2 is a flowchart of overall process of route guidance performed by the navigation system.

Next, a process of route guidance performed by the navigation system, which includes the navigation device 100 and the navigation server 300 according to the first embodiment, is described. FIG. 2 is a flowchart of overall process of route guidance performed by the navigation system according to the first embodiment.

The user of the navigation device 100 according to the first embodiment inputs in the navigation device 100, through the input unit 116, search conditions such as a place of departure and a destination, and makes a request for route search. The navigation device 100 sends the request for route search, which includes the search conditions, to the navigation server 300 via the network 200 (step S201).

The navigation server 300, which has received the request for route search from the navigation device 100, performs route search according to the search conditions included in the request for route search (step S202). Then the navigation server 300 sends the result of route search to the navigation device 100 via the network 200 (step S203).

The navigation device 100, which has received the result of route search, displays a search result screen on the display unit 110 (step S204).

In the search result screen, the user can input instructions such as "start route guidance" or "check route map" through the input unit 116 of the navigation device 100.

Figure 3:
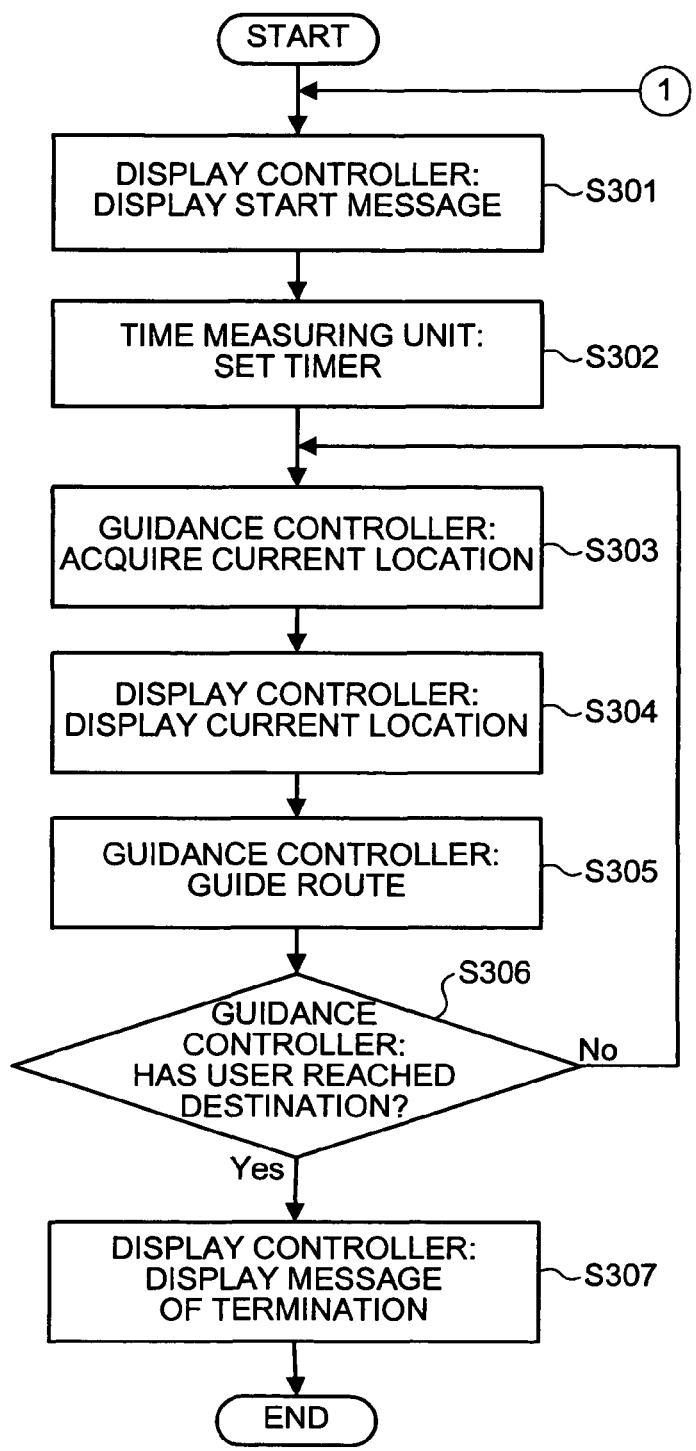
FIG. 3 is a flowchart of a route guidance process according to the first embodiment.

Next, a route guidance process that is performed by the navigation device 100 according to the first embodiment is described. FIG. 3 is a flowchart of the route guidance process performed by the navigation device 100.

When the user instructs the navigation device 100 to start the route guidance through the initial menu (not shown), a start message is displayed on the display unit 110 under the control of the display controller 130 (step S301). Then, the time measuring unit 180 sets a timer with a threshold time (step S302), which is determined in advance and input by the user through an initial screen.

Next, the guidance controller 120 acquires the information about the current location that is received by the navigation-information acquiring unit 160 from the navigation server 300 (step S303).

Then, the display controller 130 displays the current location on the map that has been displayed on the display unit 110 (step S304). Next, the route guidance is performed by the guidance controller 120 (step S305), and the guidance controller 120 determines whether the user has reached the destination (step S306). If the user has reached the destination (Yes at step S306), a message of termination (not shown) is displayed on the display unit 110 under the control of the display controller 130 (step S307).

On the other hand, if the user has not reached the destination yet (No at step S306), the above steps after step S303 are repeated.

While the route guidance is performed as described above, a communication cut-off process as described below is being performed by another task. FIG. 4 is a flowchart of the communication cut-off process.

The time measuring unit 180 determines whether the threshold time has elapsed (step S401). Then, if the threshold time has elapsed (Yes at step S401), the guidance controller 120 determines whether a route is being guided or the current location that is set in the initial menu screen is checked (step S402).

If the route is being guided or if the current location is being checked (Yes at step S402), the communication with the navigation server 300 via the communication unit 115 is cut off by the server-communication controller 170 (step S402). As a result, the navigation device 100 cannot receive the map data and the current location any more from the navigation server 300.

Next, the display controller 130 displays a menu screen on the display unit 110 (step S404). FIG. 5 is an example of the menu screen to notify the user that the threshold time has elapsed (1 hour, for example) and the navigation device 100 cannot receive the current location and the map data any more. Then, the guidance controller 120 determines whether the user instructs the navigation device 100 to continue the route guidance. If the user instructs the navigation device 100 to continue the route guidance (in other words, when the user inputs "yes") (Yes at step S405), the route guidance process shown in FIG. 3 is performed. On the other hand, if the user does not instruct the navigation device 100 to continue the route guidance (when the user inputs "no"), (No at step S405), the process is terminated.

Thus, the navigation device 100 according to the first embodiment stops receiving the current location and the map data from the navigation server 300 when the preset threshold time has elapsed from the start of route guidance (including a restart) by cutting off the communication with the navigation server 300 and coming into a standby state, thereby decreasing a traffic between the server and reducing communication charges.

According to the first embodiment, the time measuring unit 180 is realized by software. However, a hardware timer can be used as the time measuring unit.

Second Embodiment

A navigation system according to a second embodiment cuts off the communication when the information about the current location from the GPS is acquired on a side of the navigation device 100.

FIG. 6 is a block diagram of a navigation system including a navigation device according to the second embodiment. As shown in FIG. 6, the navigation system includes a navigation device 600, the network 200, and a navigation server 670.

A configuration of the navigation device 600 according to the second embodiment differs from that of the navigation device 100 according to the first embodiment at a point that a GPS unit 614 and a GPS-communication controller 650 are provided, and the rest of the configuration of other units is similar to that of the navigation device 100 according to the first embodiment. Here, the GPS unit 614 forms a location acquiring unit in the present invention.

The GPS unit 614 has a GPS antenna etc. and outputs the information about the current location to the guidance controller 120 of a controlling unit 617 based on information received from a satellite. Here, when the GPS unit 614 can acquire the location information, it outputs data that includes coordinates of the current location to the guidance controller 120 as the information about the current location. Moreover, communication and cutting-off the communication of the GPS unit 614 with the GPS by radio waves from the satellite is controlled by the GPS-communication controller 650.

The GPS-communication controller 650 starts communication with the GPS when the route guidance by the initial menu (not shown in the diagram) of the route guidance is started. On the other hand, when a request for cutting off communication from the guidance controller 120 is input, the GPS-communication controller 650 cuts off the communication with the GPS and the satellite radio waves from the GPS are not received by the GPS unit 614.

According to the second embodiment, since the navigation device 600 acquires the current location from the GPS, a configuration of the navigation server 670 differs from that of the navigation server 300 at a point that there is no location-information acquiring unit, however a configuration of other units is similar to that of the unit in the navigation server 300 according to the first embodiment.

Figure 7:
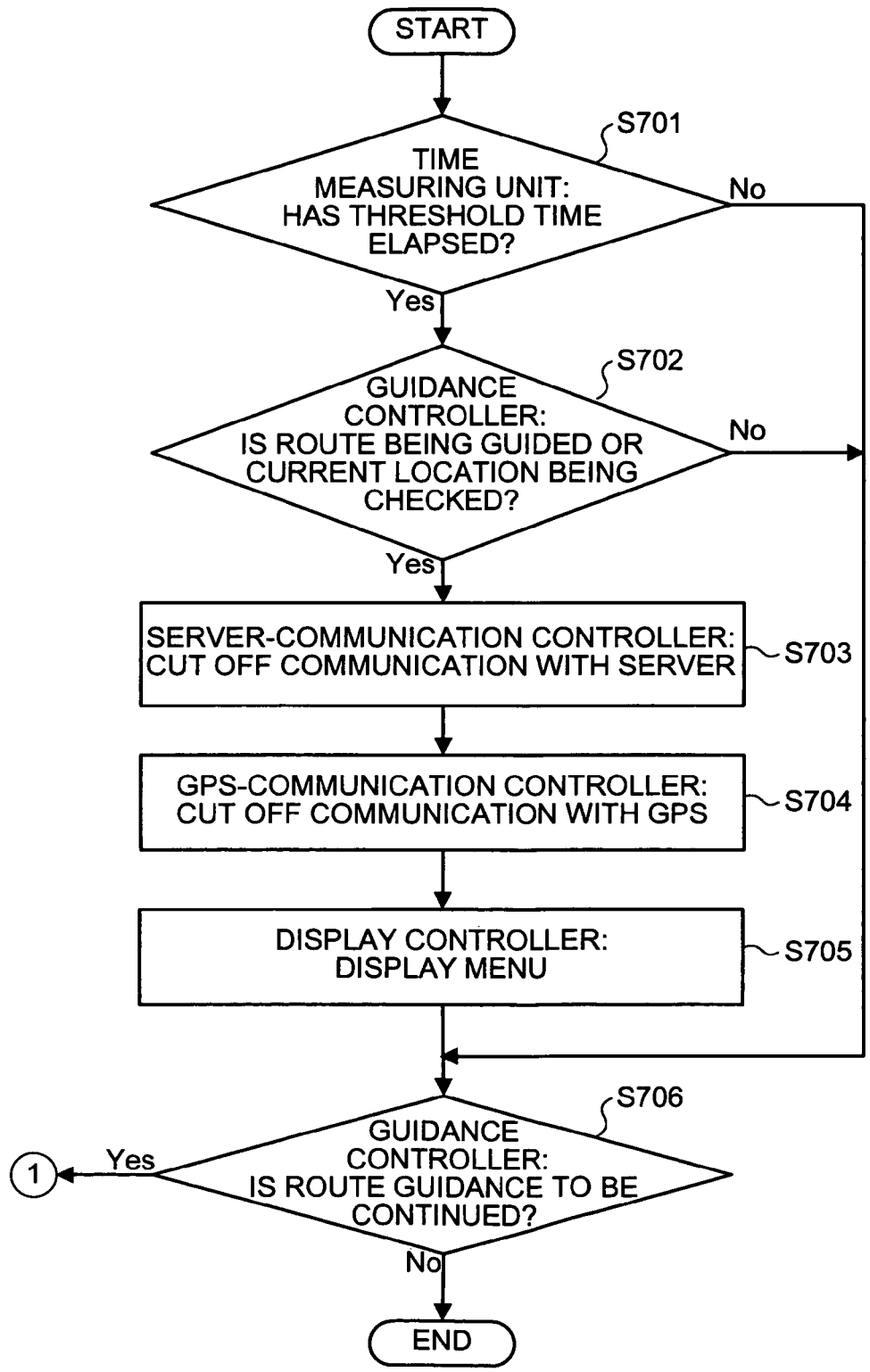
FIG. 7 is a flowchart of a communication cut-off process according to the second embodiment.

The route guidance process according to the second embodiment is performed similarly as the route guidance process of the navigation device 100 according to the first embodiment described in FIG. 3. FIG. 7 is a flowchart of a communication cut-off process performed by the navigation device 600 according to the second embodiment.

In the communication cut-off process according to the second embodiment, when the threshold time is elapsed (step S701) and a judgment of the route being guided or the current location being checked is made (step S702), not only the communication with the navigation server 670 is cut off (step S703) but also the communication with the GPS is also cut off by the GPS-communication controller 650 (step S704). By this, apart from not receiving the map data from the navigation server 670, the information of current location from the GPS is not received as well. The process from here onward is similar to that according to the first embodiment.

Thus, in the navigation device 600 according to the second embodiment, since when the threshold time that is set in advance from the start (including restart as well) of route guidance is elapsed, the communication with the navigation server 300 is cut off, and the communication with the GPS is cut off and it comes to the standby state, it is possible to stop receiving the information of current location from the GPS and the map data from the navigation server 300 by elapsing of a fixed time, to decrease the traffic between the server, and to reduce the load of communication charge, as well as to reduce excessive power consumption.

Moreover, according to the second embodiment, when the fixed time has elapsed and a judgment of the route being guided or the current location being checked is made, not only the communication with the navigation server 670 is cut off but also the communication with the GPS by the GPS-communication controller 650 is cut off, however it may be structured such that the communication with the GPS is not cut off. In this case, a map that is displayed currently on the screen cannot be updated however the current location can be displayed on the current map, which is an advantage.

Third Embodiment

A navigation system according to a third embodiment is a system in which the communication cut-off process is performed based on a distance from a point of time at which the route guidance is started, is calculated.

Figure 8:
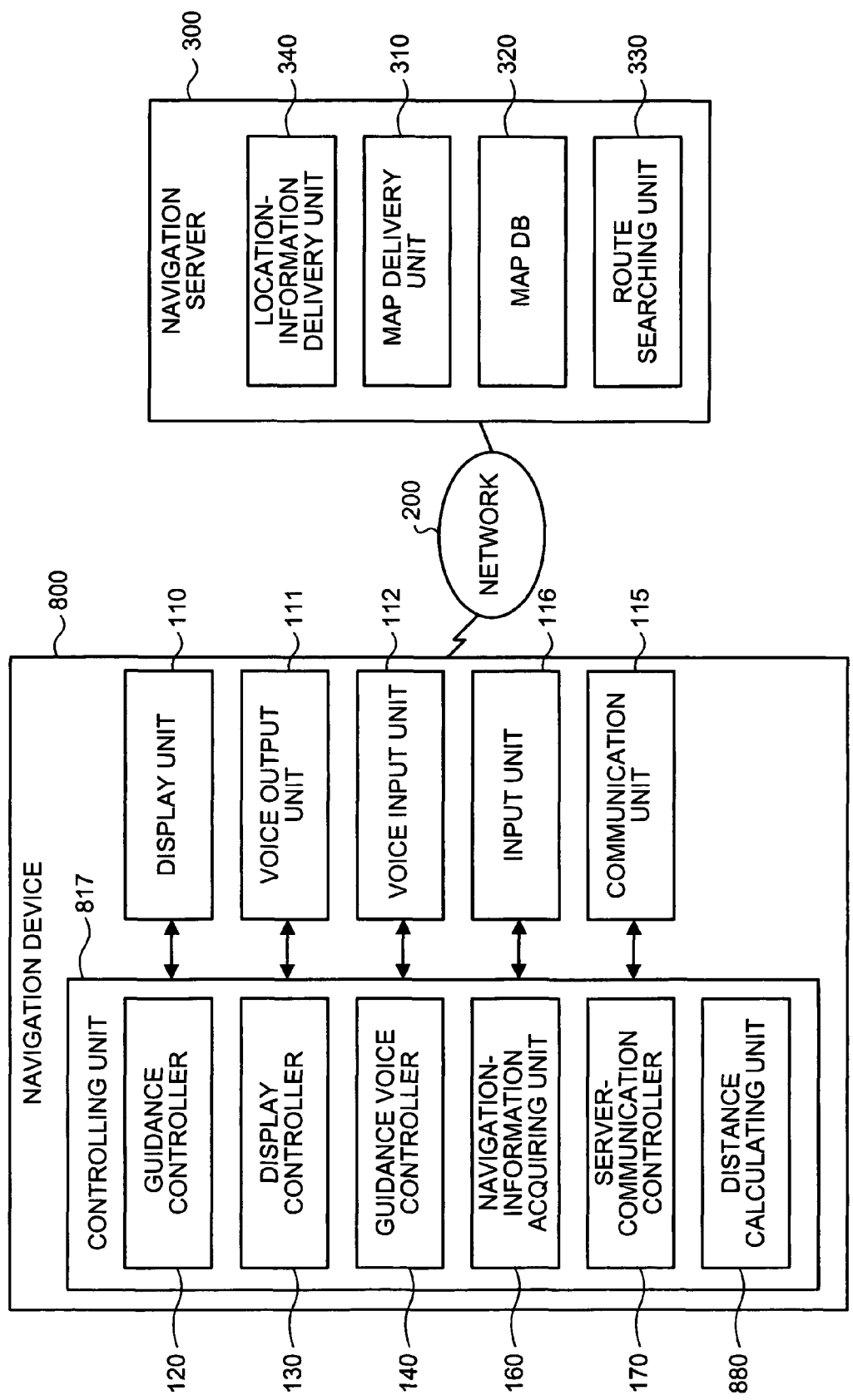
FIG. 8 is a block diagram of a navigation system including a navigation device according to a third embodiment of the present invention.

FIG. 8 is a block diagram of a navigation system including a navigation device according to the third embodiment. As shown in FIG. 8, the navigation system includes a navigation device 800, the network 200, and the navigation server 300.

A configuration of the navigation device 800 according to the third embodiment differs from that of the navigation device 100 according to the first embodiment at a point that a distance calculating unit 880 is provided, and a configuration of the other units is similar to that of the navigation device 100 according to the first embodiment. Moreover, a configuration of the navigation server 300 is similar to that according to the first embodiment.

The distance calculating unit 880 calculates a travel distance from information about the current location that is acquired at a point of time of start of the route guidance and information about the current location that is acquired at a current point of time.

Further, the user sets in advance a threshold distance on the initial screen, which can be changed later. Moreover, the threshold distance that is in multiples of a fixed distance may be used as well.

Figure 9:
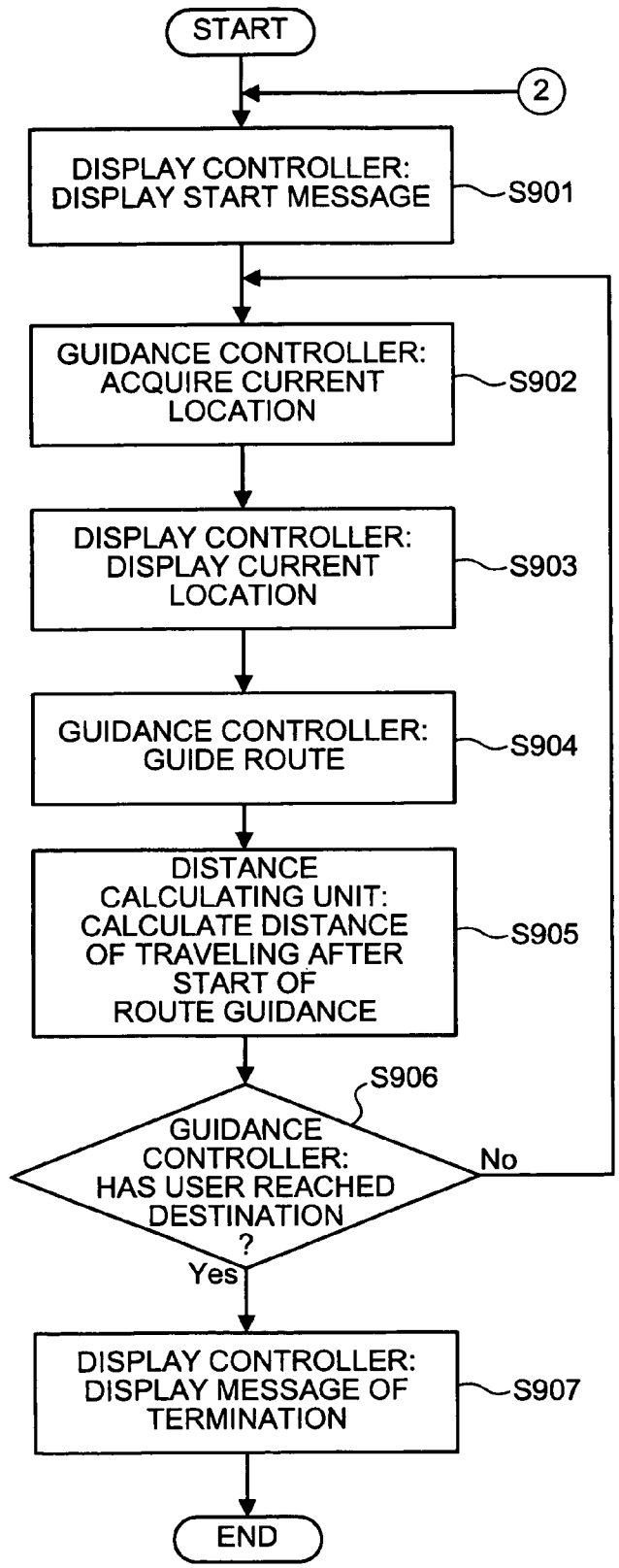
FIG. 9 is a flowchart of a route guidance process according to the third embodiment.

FIG. 9 is a flowchart of a route guidance process according to a third embodiment. In the route guidance process according to the third embodiment the timer setting is not performed as in the route guidance process according to the first embodiment, and instead of that after the route guidance process (step S904), a distance from the point of time of start of the route guidance up to the current location is calculated by the distance calculating unit 880 (step S905). The rest of the process is similar to the route guidance process of the navigation device 100 according to the first embodiment described in FIG. 3.

Figure 10:
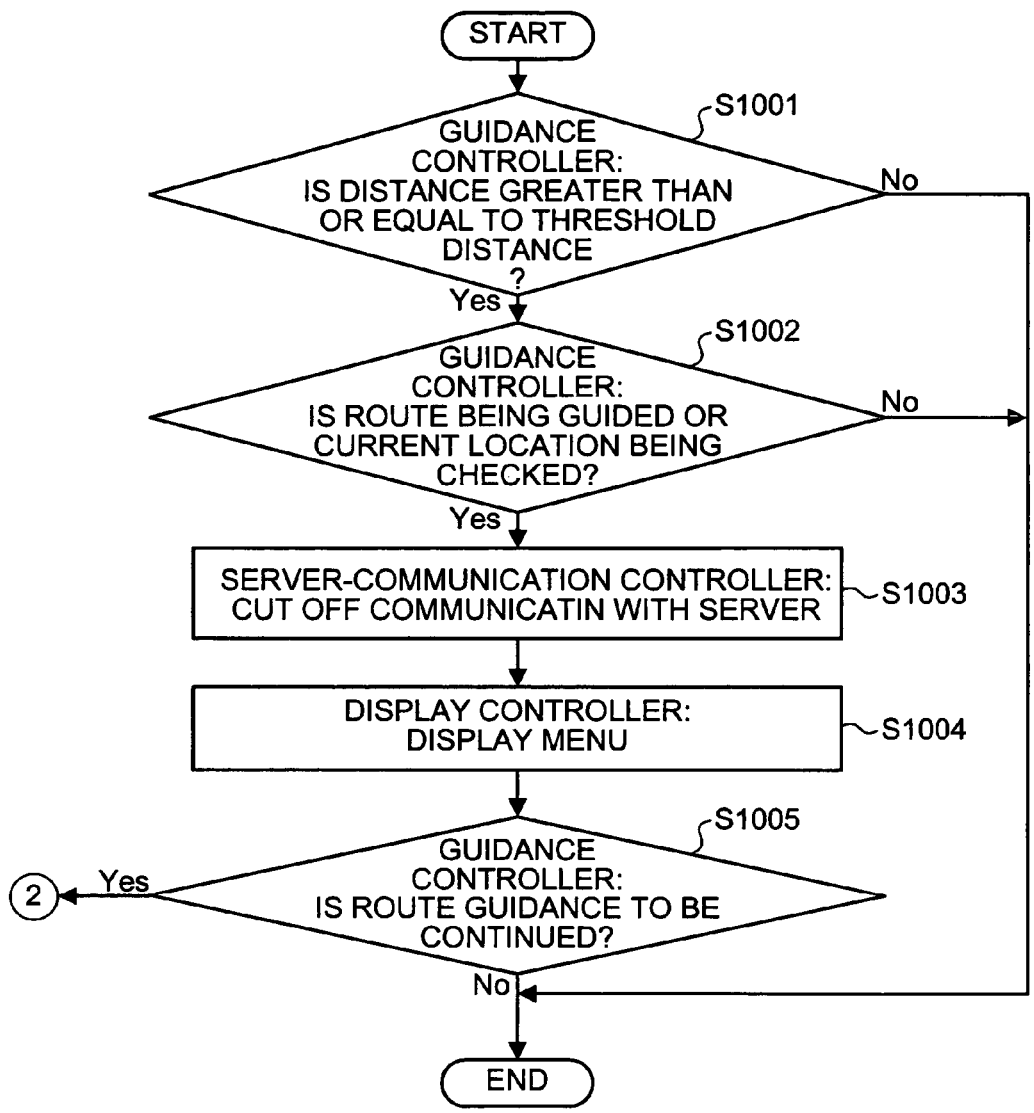
FIG. 10 is a flowchart of a communication cut-off process according to the third embodiment.

FIG. 10 is a flowchart of a communication cut-off process performed by the navigation device 800 according to the third embodiment. To start with, a judgment of whether the distance calculated by the distance calculating unit 880 has crossed the distance that is set in advance or not is made (step S1001). Then, if it is judged to have crossed the threshold distance (Yes at step S1001), a judgment of whether currently the route is being guided or the current location that is set on the initial-menu screen is being checked or not is made (step S1002).

Then, if the route is being guided or if the current location is being checked (Yes at step S1002), the communication with the navigation server 300 via the communication unit 115 is cut off by the server-communication controller 170 (step S1003). By this, since the data from the navigation server 300 cannot be received, the map data and the information about the current location from the navigation server 300 are not received.

Figure 11:
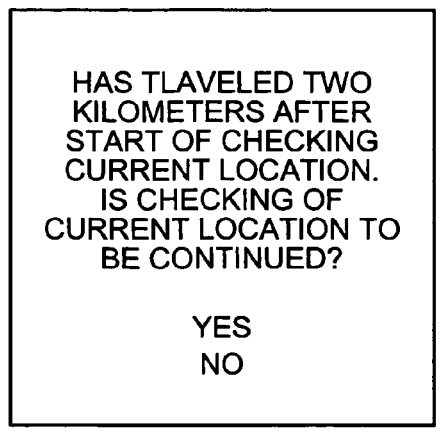
FIG. 11 is an example of a menu screen according to the third embodiment.

Next, the menu screen is displayed on the display unit 110 by the display controller 130 (step S1004). FIG. 11 is an example of the menu screen according to the third embodiment. From the menu screen, it can be revealed that the user has gone passed the distance from the point of time of start of the route guidance up to the current location exceeding the threshold distance (2 km in the example) and has not been able to acquire the information about the current location and the map data. The process from here onward is similar to the communication cut-off process according to the first embodiment.

Thus in the navigation device 800 according to the third embodiment, if the distance from the point of time of start of route guidance (including restart as well) exceeds the threshold distance that is set in advance, since the communication with the navigation server 300 is cut off and it comes to into the standby state, when a fix distance is exceeded, it is possible to stop reception of the information about the current location and the map data from the navigation server 300, to decrease the traffic between the server, and to reduce the load of communication charges.

Further, according to the third embodiment, as according to the second embodiment, the navigation device 800 may be structured to acquire the information about the current location from the GPS on its own, and may as well be structured to cut off the communication with the GPS when the threshold distance is exceeded. In this case, furthermore, it may be structured such that only the communication with the navigation server 300 is cut off and the communication with the GPS is not cut off. In this case, the map that is displayed on the current screen cannot be updated, however, the current location on the current map can be displayed, which is an advantage.

Fourth Embodiment

A navigation system according to a fourth embodiment performs a communication cut-off process based on a velocity of traveling that is calculated from a current point of time.

Figure 12:
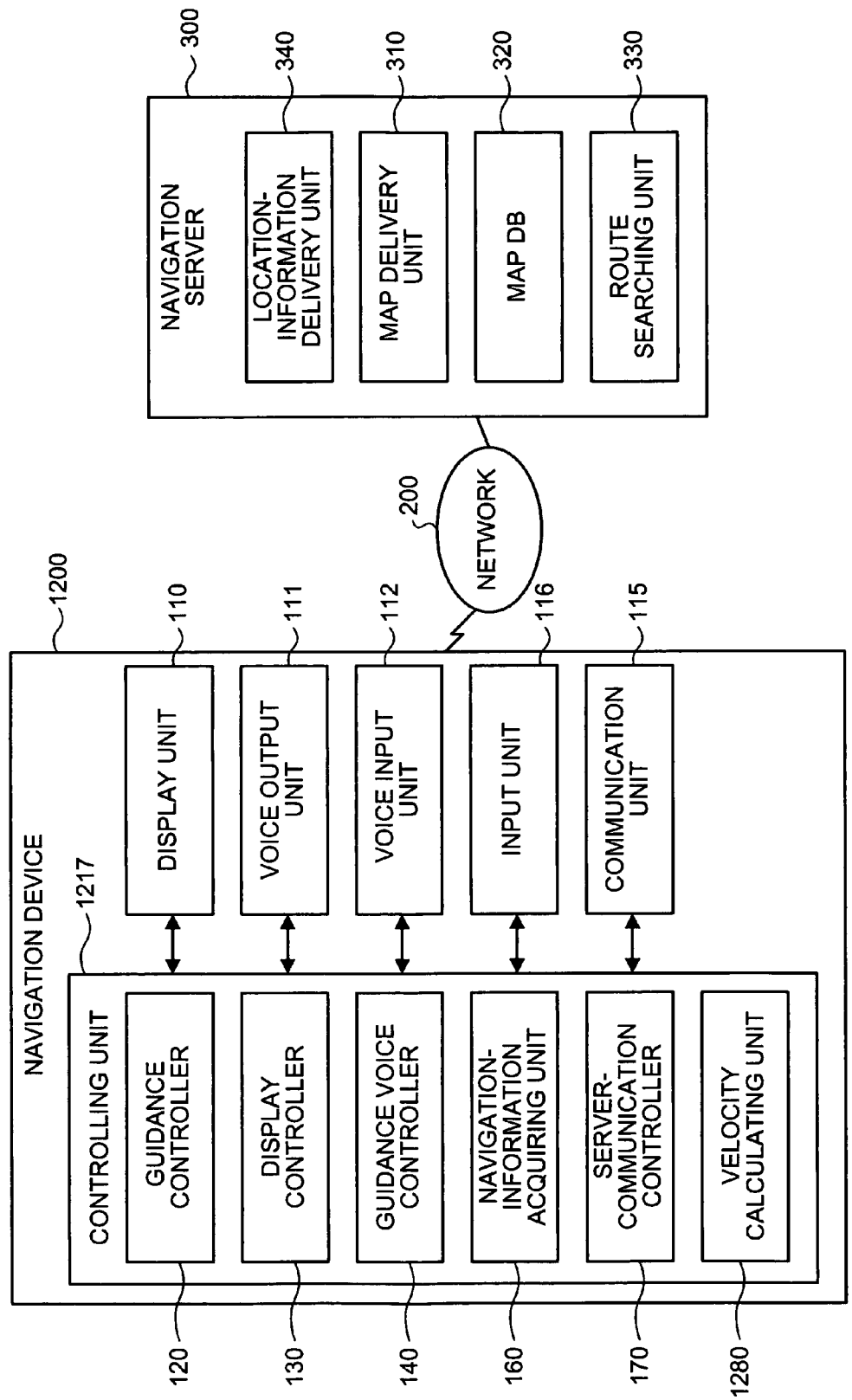
FIG. 12 is a block diagram of a navigation system including a navigation device according to a fourth embodiment of the present invention.

FIG. 12 is a block diagram of a navigation system including a navigation device according to the fourth embodiment. As shown in FIG. 12, the navigation system includes a navigation device 1200, the network 200, and the navigation server 300.

A configuration of the navigation device 1200 according to the fourth embodiment differs from the navigation device 100 according to the first embodiment at a point that a velocity calculating unit 1280 is provided, and a configuration of the remaining units is similar to that of the navigation device 100 according to the first embodiment. Moreover, the configuration of the navigation server 300 is similar to that according to the first embodiment.

The velocity calculating unit 1280 calculates the current velocity of traveling from the information about the current location at the current point of time, the information about the current location that is acquired previously, and time elapsed at two points of time.

Further, the user sets in advance a threshold velocity on the initial screen and it can be changed later. Moreover, a threshold velocity that is in multiples of a fixed velocity may be used as well.

Figure 13:
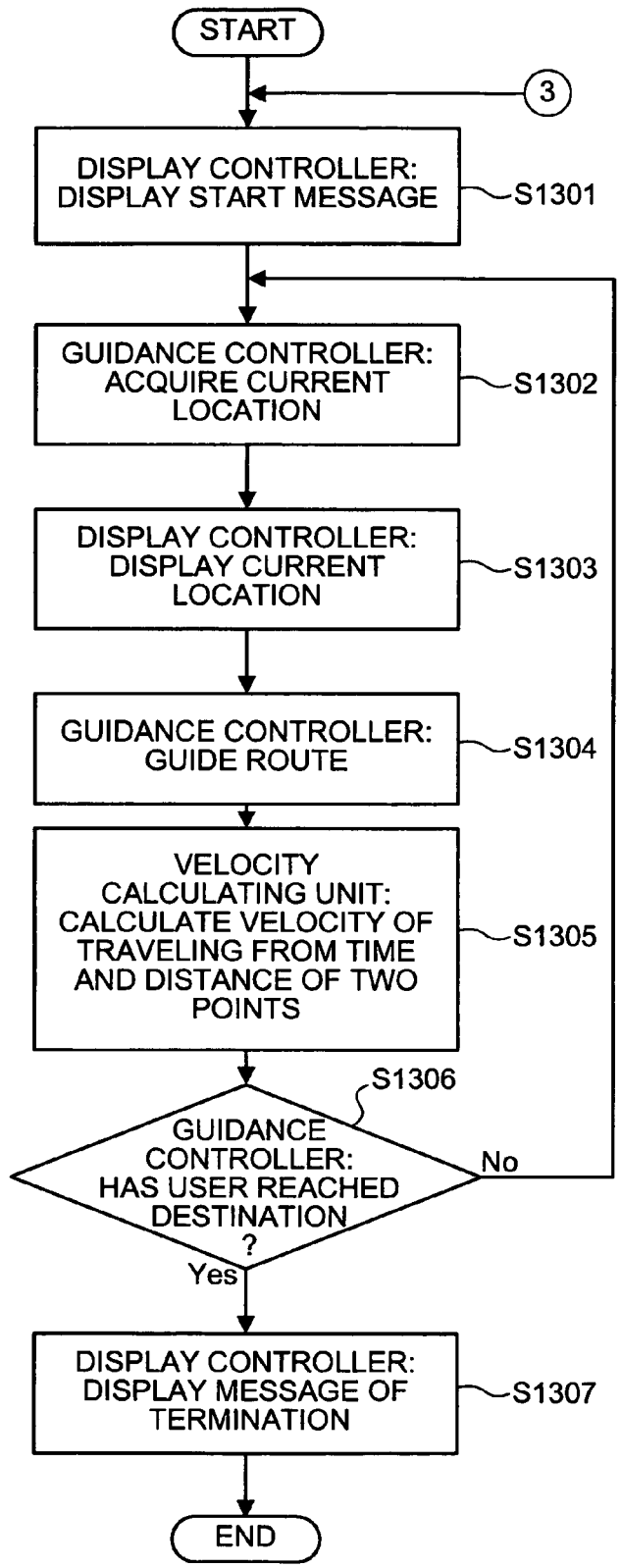
FIG. 13 is a flowchart of a route guidance process according to the fourth embodiment.

FIG. 13 is a flowchart of a route guidance process according to the fourth embodiment. In the route guidance process according to the fourth embodiment, unlike in the route guidance process according to the first embodiment, the timer setting is not performed, and instead of that, after the route guidance process (step S1304), the current velocity of traveling is calculated by the velocity calculating unit 1280 (step S1305). Rest of the process is performed similarly as the route guidance process of the navigation device 100 according to the first embodiment as described in FIG. 3.

FIG. 14 is a flowchart of a communication cut-off process performed by the navigation device 1200 according to the fourth embodiment. To start with, a judgment of whether the velocity that is calculated by the velocity calculating unit 1280 has exceeded the threshold velocity that is set in advance or not is made by the guidance controller 120 (step S1401). Then, if it is judged to have exceeded the threshold velocity (Yes at step S1401), a judgment of whether currently the route is being guided or whether the current location that is set on the initial-menu screen is being checked or not is made by the guidance controller 120 (step S1402).

Further, if the route is being guided or if the current location is being checked (Yes at step S1402), the communication with the navigation server 300 via the communication unit 115 is cut off by the server-communication controller 170 (step S1403). By this, since the data from the navigation server 300 cannot be received, the map data and the information about the current location from the navigation server 300 are not received.

Next, the menu screen is displayed on the display unit 110 by the display controller 130 (step S1404). FIG. 15 is an example of a menu screen according to the fourth embodiment. From this menu screen, it can be revealed that the user has used a bus, a train etc. for example, the current velocity of traveling has exceeded the threshold velocity (50 km/h in the example), and that the map data and the information about the current location cannot be acquired. The rest of the process is similar to the communication cut-off process according to the first embodiment.

Thus, in the navigation device 1200 according to the fourth embodiment, if the current velocity exceeds the threshold velocity that is set in advance, since the communication with the navigation server 300 is cut off and it comes to the standby state, it is possible to stop reception of the information about the current location and the map data from the navigation server 300 while using a means of transport other than walking, such as a bus and a train, to decrease the traffic between the server, and to reduce the load of the communication charges.

Further, according to the fourth embodiment, as according to the second embodiment, the navigation device 1200 may be structured to acquire the information of current location from the GPS on its own, and may as well be structured to cut off the communication with the GPS when the velocity exceeds the threshold velocity. In this case, further, it may be structured such that only the communication with the navigation server 300 is cut off and the communication with the GPS is not cut off. In this case, the map that is displayed on the current screen cannot be updated however the current location can be displayed on the current map, which is an advantage.

Fifth Embodiment

A navigation system according to a fifth embodiment performs the communication cut-off process based on a packet size of data that is received from the navigation server 300 on a side of the navigation device, which is detected.

FIG. 16 is a block diagram of a navigation system including the navigation device according to the fifth embodiment. As shown in FIG. 16, the navigation system includes a navigation device 1600, the network 200, and the navigation server 300.

A configuration of the navigation device 1600 according to the fifth embodiment differs from the navigation device 100 according to the first embodiment at a point that a packet-amount calculating unit 1680 is provided and a configuration of the remaining units is similar to that in the navigation device 100 according to the first embodiment.

The packet-amount calculating unit 1680 calculates a packet size that is received from the navigation server 300 from the point of time of start of the route guidance up to the current point of time. The packet size is stored in header information that is received, and every time a packet is received, the packet size is acquired from the header information and the packet size acquired is added and saved in a memory etc.

Further, the user sets in advance a threshold size on the initial screen etc. and it can be changed later. Moreover, a threshold size that is in multiples of a fixed size may be used as well.

Figure 17:
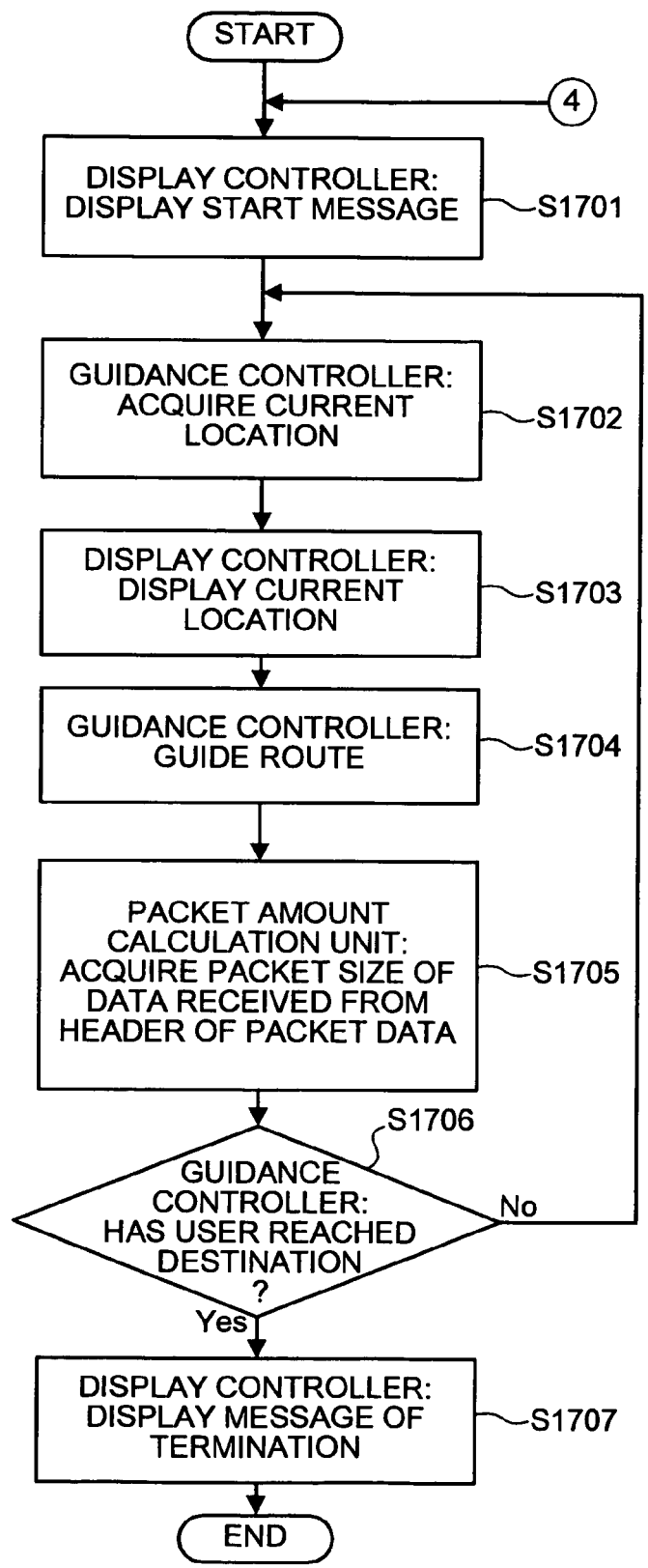
FIG. 17 is a flowchart of a route guidance process according to the fifth embodiment.

FIG. 17 is a flowchart of a route guidance process according to the fifth embodiment. In the route guidance process according to the fifth embodiment, unlike in the route guidance process according to the first embodiment, the timer setting is not performed, and instead of that after the route guidance process (step S1704), the packet size at the current point of time is calculated by the packet-amount calculating unit 1680 (step S1705). Rest of the process is performed similarly as the route guidance process of the navigation device 100 according to the first embodiment as described in FIG. 3.

Figure 18:
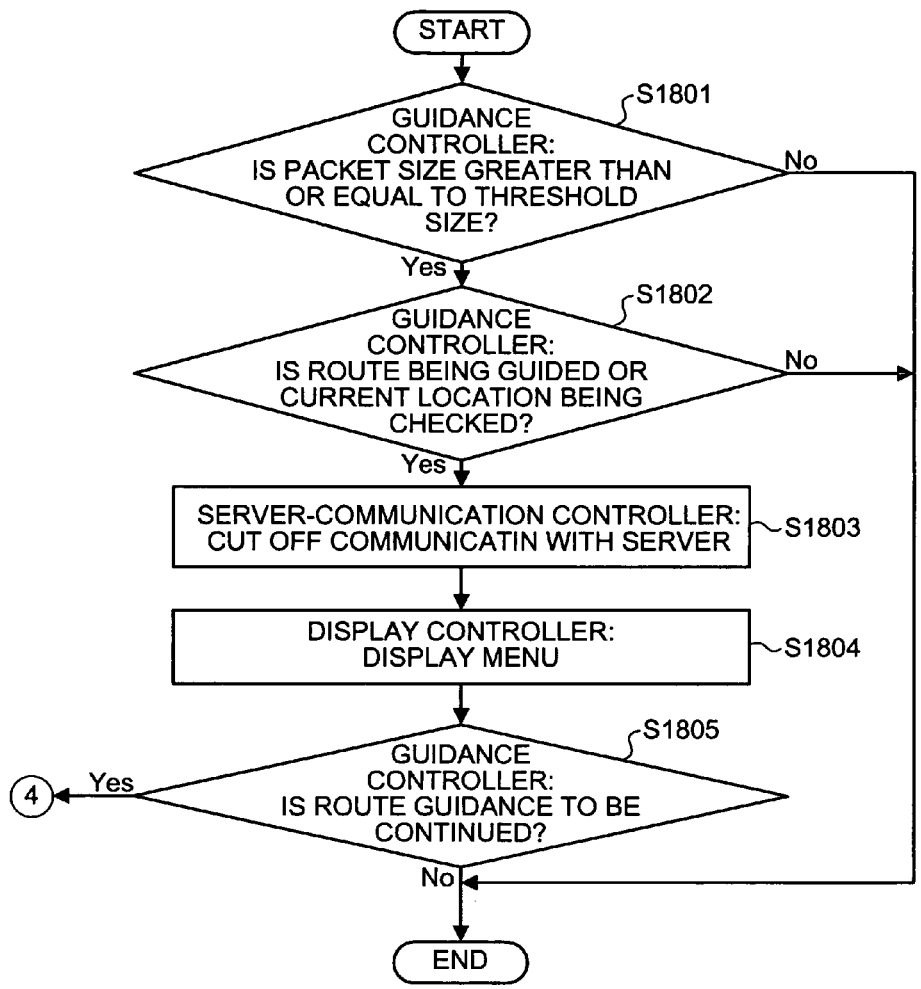
FIG. 18 is a flowchart of a communication cut-off process according to the fifth embodiment.

FIG. 18 is a flowchart of a communication cut-off process performed by the navigation device 1600 according to the fifth embodiment. To start with, a judgment of whether a total size of the packet that is calculated by the packet-amount calculating unit 1680 has exceeded the threshold size that is set in advance or not is made by the guidance controller 120 (step S1801).

Then, if it is judged to have exceeded the threshold size (Yes at step 1801), a judgment of whether currently the route is being guided or whether the current location that is set on the initial-menu screen is being checked or not is made by the guidance controller 120 (step S1802).

Then, if the route is being guided or if the current location is being checked (Yes at step S1802), the communication with the navigation server 300 via the communication unit 115 is cut off by the server-communication controller 170 (step S1803). By this, since the data from the navigation server 300 cannot be received, the map data and the information about the current location from the navigation server 300 are not received.

Figure 19:
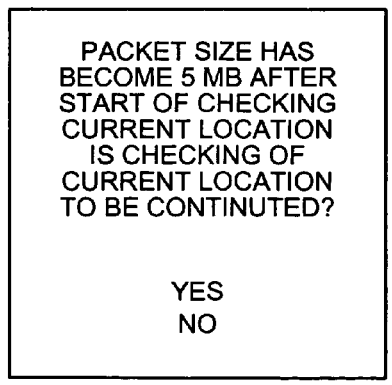
FIG. 19 is an example of a menu screen according to the fifth embodiment.

Next, the menu screen is displayed on the display unit 110 by the display controller 130 (step S1804). FIG. 19 is an example of a menu screen according to the fifth embodiment. From this menu screen, it can be revealed that the size of the packet received so far has exceeded the threshold size (5 MB in this example), and that the map data and the information about the current location cannot be acquired. The rest of the process is similar to the communication cut-off process according to the first embodiment.

Thus, in the navigation device 1600 according to the fifth embodiment, if the packet size that is received from the navigation server 300 at the current point of time exceeds the threshold size that is set in advance, since the communication with the navigation server 300 is cut off and it comes to the standby state, it is possible to stop reception of the information about the current location and the map data from the navigation server 300, to decrease the traffic between the server, and to reduce the load of the communication charges.

Further, according to the fifth embodiment, as according to the second embodiment, the navigation device 1600 may be structured to acquire the information of current location from the GPS on its own, and may as well be structured to cut off the communication with the GPS when the packet size exceeds the threshold packet size. In this case, further, it may be structured such that only the communication with the navigation server 300 is cut off and the communication with the GPS is not cut off. In this case, the map that is displayed on the current screen cannot be updated however the current location can be displayed on the current map, which is an advantage.

Sixth Embodiment

A navigation system according to a sixth embodiment calculates a packet size of data that is sent to the navigation server on a side of a navigation server, and restricts a transmission of map data based on the packet size.

Figure 20:
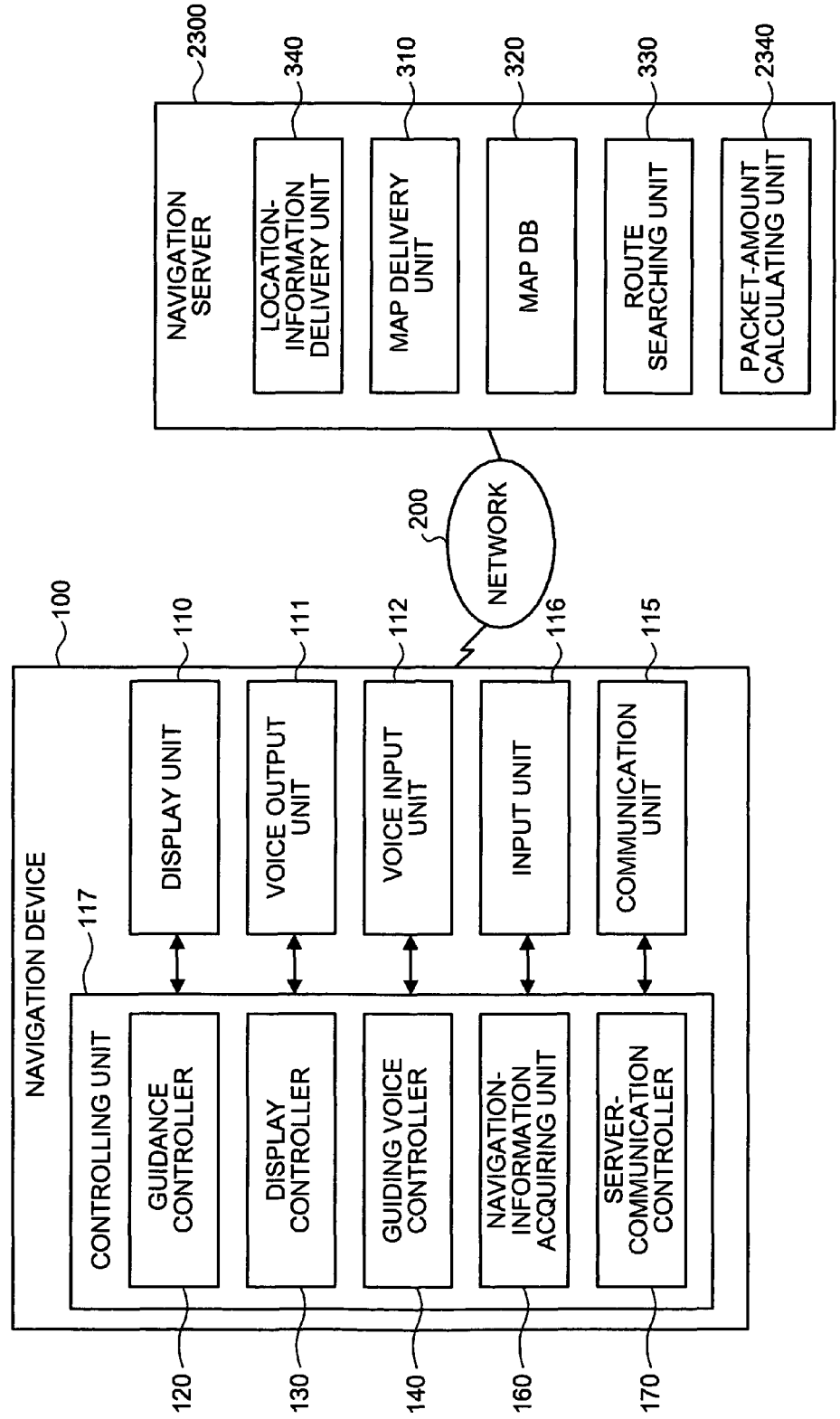
FIG. 20 is a block diagram of a navigation system including a navigation server according to a sixth embodiment of the present invention.

FIG. 20 is a block diagram of a navigation system including a navigation server according to the sixth embodiment. As shown in FIG. 20, the navigation system includes the navigation device 100, the network 200, and a navigation server 2300.

A configuration of the navigation device 100 according to the sixth embodiment is similar to that of the navigation device according to the first embodiment. The navigation server 2300 according to the sixth embodiment differs from the navigation server 300 according to the first embodiment at a point that a packet-amount calculating unit 2340 is provided and a configuration of the remaining units is similar to that in the navigation server 300 according to the first embodiment.

The packet-amount calculating unit 2340 calculates a packet size that is sent to the navigation device 100 from the navigation server 2300 from the point of time of start of the route guidance up to the current point of time. The packet size is acquired from header information of the packet when the packet is created from the map data that is to be sent, and the packet size that is acquired is added to the packet size that is sent already and saved in a memory etc.

Further, a manager etc. of the navigation server 2300 sets in advance the threshold size and it can be changed later. Moreover, a threshold size that is in multiples of a fixed size may be used as well.

Figure 21:
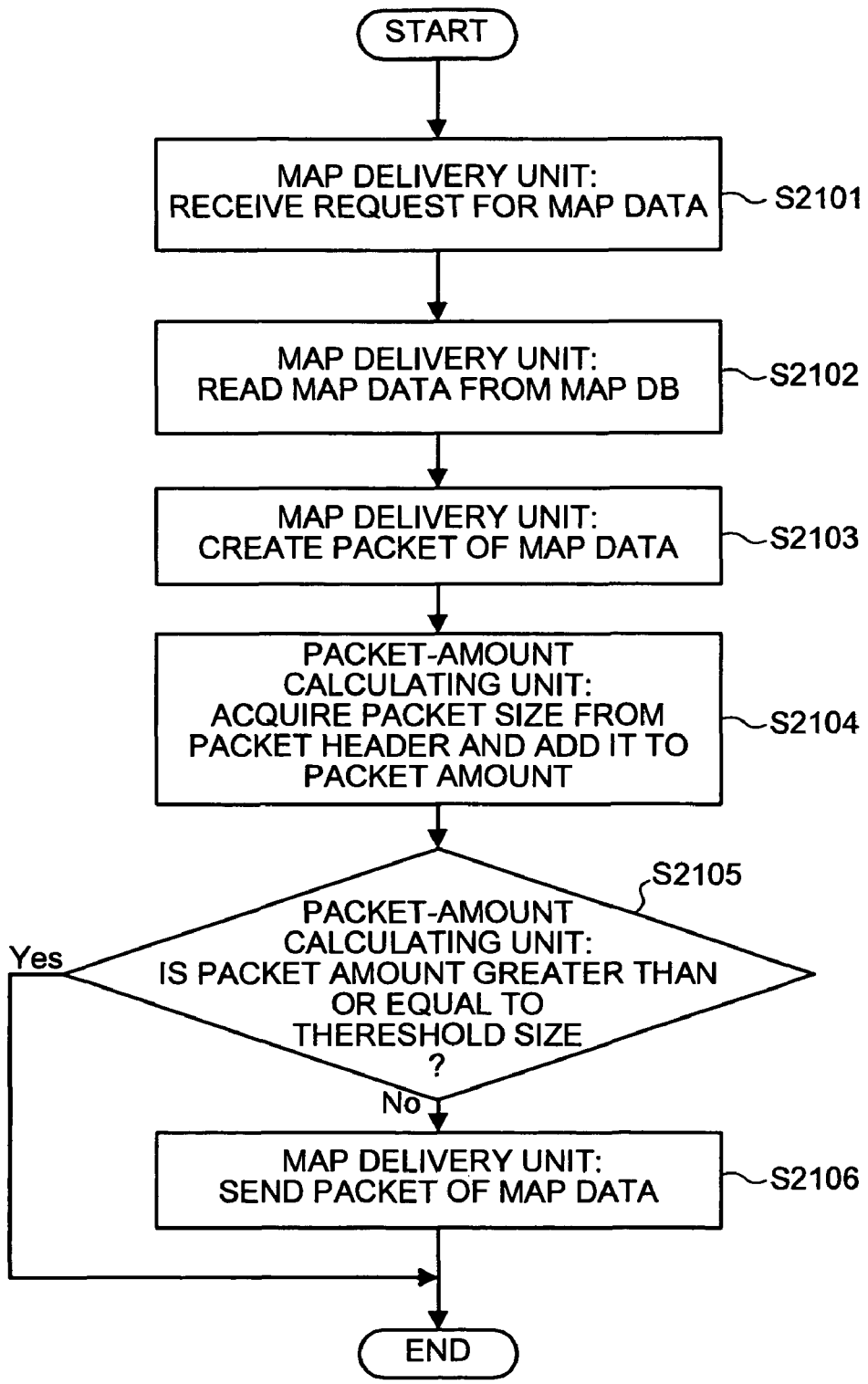
FIG. 21 is a flowchart of a map-data transmission process according to the sixth embodiment.

FIG. 21 is a flowchart of a map-data transmission process according to the sixth embodiment. To start with, when the map delivery unit 310 receives a request for the map data from the navigation device 100, (step S2101), it searches the map data from the map database 320 for which the request is made by the map delivery unit 310, and reads the map data that is searched (step S2102).

Next, the map delivery unit 310 creates a packet of the map data in a format according to a communication protocol of the network 200 from the map data that is read (step S2103). Then, the packet size is acquired from the header information of the packet by the packet-amount calculating unit 2340, and is added to the packet size that is already sent and multiplied (step S2104).

Then, a judgment of whether or not the packet size that is sent is bigger than the threshold size that is set in advance is made by the packet-amount calculating unit 2340 (step S2105). If the size is judged not to be bigger than the threshold size (No at step 2105), the map delivery unit 310 sends the packet of the map data to the navigation device 100. However, if the size of the packet sent is judged to be bigger than the threshold size (Yes at step 2105), the packet transmission of the map data by the map delivery unit 310 is not performed and the process is terminated.

Thus, in the navigation device 100, if the size of the packet sent exceeds the threshold size that is set in advance, since the navigation server 2300 does not perform the transmission of the packet of the map data to the navigation device 100, on a side of the navigation device 100, it is possible to stop reception of the information about the current location and the map data from the navigation server 2300, to decrease a traffic between the server, and to reduce the load of the communication charges.

Further, in the navigation device according to these embodiments, a structure may be such that if further the information of current location cannot be acquired or if the current location is deviated from a route up to the destination by more than a predetermined distance, the communication with the navigation server is cut off and the communication with the GPS is cut off.

Moreover, according to these embodiments, the CPU of a controlling unit has been let to perform a process including a guiding process as mentioned above according to a computer program that is stored in a storage unit of the ROM, however an arrangement may be made to provide a computer program for causing a computer to perform a similar process, to the user by a communication line such as the Internet, or an arrangement may be made to record the computer program on a computer readable recording medium such as a CD-ROM (Compact Disc-Read only Memory) and to provide to the user. Moreover, the navigation device may be structured to realize by a dedicated hardware line that performs the process mentioned above, and be provided to the user.

INDUSTRIAL APPLICABILITY

Thus, a navigation device, a navigation method, and a computer product according to the present invention are useful in route guidance using a portable navigation device.

The invention claimed is:

1. A navigation device that performs a route guidance based on a route from a current location to a destination, the navigation device being connected to a server for searching the route, the navigation device comprising:
   a communication controller configured to send a request for searching the route to the server;
   a guidance-information receiving unit configured to receive information on the route from the server;
   a time measuring unit configured to measure an elapsed time from a start of the route guidance; and
   a guidance controller configured to perform the route guidance based on the information received, wherein
   the communication controller commands the navigation device to cut off a communication with the server and to stand by upon a determination that the elapsed time measured has reached a predetermined time and when the route is being guided or a current location is being checked by the guidance controller, to decrease a bandwidth usage between the navigation device and the server and to reduce a communication charge associated with the bandwidth usage.

2. The navigation device according to claim 1, further comprising:
   a distance calculating unit configured to calculate a distance of traveling of the navigation device after the start of the route guidance, wherein the communication controller commands the navigation device to cut off a communication with the server and to stand by upon a determination that the distance calculated has reached a predetermined distance and when the route is being guided or the current location is being checked by the guidance controller, to decrease the bandwidth usage between the navigation device and the server and to reduce the communication charge associated with the bandwidth usage.

3. The navigation device according to claim 1, further comprising:
   a velocity calculating unit configured to calculate a velocity of traveling of the navigation device, wherein the communication controller commands the navigation device to cut off a communication with the server and to stand by upon a determination that the velocity calculated has reached a predetermined velocity and when the route is being guided or the current location is being checked by the guidance controller, to decrease the bandwidth usage between the navigation device and the server and to reduce the communication charge associated with the bandwidth usage.

4. The navigation device according to claim 1, wherein the navigation device is a portable telephone.

5. The navigation device according to claim 1, further comprising:
   a location determining unit configured to determine the current location by performing a communication with a global positioning system, wherein the communication with the global positioning system is cut off based on a status of the navigation device.

6. A navigation device that performs a route guidance based on a route from a current location to a destination, the navigation device being connected to a server for searching the route, the navigation device comprising:
   a communication controller configured to send a request for searching the route to the server;
   a guidance-information receiving unit configured to receive information on the route from the server;
   a guidance controller configured to perform the route guidance based on the information received; and
   a data-amount calculating unit configured to calculate an amount of the information received, and to add the amount of information received to an amount of information that was previously sent and saved in a memory, wherein
   the communication controller commands the navigation device to cut off a communication with the server and to stand by upon a determination that the amount saved in the memory has reached a predetermined amount and when the route is being guided or the current location is being checked by the guidance controller, to decrease a bandwidth usage between the navigation device and the server and to reduce a communication charge associated with the bandwidth usage.

7. The navigation device according to claim 6, wherein the navigation device is a portable telephone.

* * * * *